(12) United States Patent
Hay et al.

(10) Patent No.: US 8,806,133 B2
(45) Date of Patent: Aug. 12, 2014

(54) PROTECTION AGAINST CACHE POISONING

(75) Inventors: Roee Hay, Haifa (IL); Adi Sharabani, Haifa (IL)

(73) Assignee: International Business Machines Corporation, Armonk, NY (US)

(*) Notice: Subject to any disclaimer, the term of this patent is extended or adjusted under 35 U.S.C. 154(b) by 619 days.

(21) Appl. No.: 12/559,122

(22) Filed: Sep. 14, 2009

(65) Prior Publication Data

US 2011/0066807 A1 Mar. 17, 2011

(51) Int. Cl.
*G06F 12/00* (2006.01)

(52) U.S. Cl.
USPC ............. 711/119; 711/118; 711/E12.023

(58) Field of Classification Search
USPC ................... 711/118, 119, E12.023
See application file for complete search history.

(56) References Cited

U.S. PATENT DOCUMENTS

| | | | |
|---|---|---|---|
| 6,324,623 B1 | 11/2001 | Carey | |
| 6,347,358 B1* | 2/2002 | Kuwata | 711/113 |
| 6,516,388 B1 | 2/2003 | McCormick et al. | |
| 7,386,110 B2 | 6/2008 | Petrunka et al. | |
| 2002/0107935 A1* | 8/2002 | Lowery et al. | 709/216 |
| 2004/0039880 A1* | 2/2004 | Pentkovski et al. | 711/146 |
| 2004/0064653 A1* | 4/2004 | Gharachorloo et al. | 711/145 |
| 2006/0088037 A1 | 4/2006 | Finley, Jr. et al. | |
| 2006/0168318 A1* | 7/2006 | Twiss | 709/238 |
| 2006/0209818 A1 | 9/2006 | Purser | |
| 2006/0248131 A1 | 11/2006 | Marwinski et al. | |
| 2007/0245085 A1 | 10/2007 | Hoshino et al. | |
| 2010/0070715 A1* | 3/2010 | Waltermann et al. | 711/129 |
| 2010/0235581 A1* | 9/2010 | Anderson et al. | 711/130 |

FOREIGN PATENT DOCUMENTS

| | | |
|---|---|---|
| CN | 101404649 | 4/2009 |
| JP | 2000-187617 | 7/2000 |
| JP | 2005-157605 | 6/2005 |
| JP | 2006-195533 | 7/2006 |

OTHER PUBLICATIONS

International Search Report and Written Opinion for Application PCT/EP2010/062731, mailed Jan. 25, 2011, 11 pages.
"Optimized Bandwidth + Secured Access = Accelerated Data Delivery," A ViSolve White Paper, ViSolve, Inc., Mar. 2009, 16 pages.

(Continued)

*Primary Examiner* — Larry Mackall
(74) *Attorney, Agent, or Firm* — VanLeeuwen & VanLeeuwen; Terrence J. Carroll

(57) ABSTRACT

Protecting computers against cache poisoning, including a cache-entity table configured to maintain a plurality of associations between a plurality of data caches and a plurality of entities, where each of the caches is associated with a different one of the entities, and a cache manager configured to receive data that is associated with any of the entities and store the received data in any of the caches that the cache-entity table indicates is associated with the entity, and receive a data request that is associated with any of the entities and retrieve the requested data from any of the caches that the cache-entity table indicates is associated with the requesting entity, where any of the cache-entity table and cache manager are implemented in either of computer hardware and computer software embodied in a computer-readable medium.

10 Claims, 6 Drawing Sheets

(56) References Cited

OTHER PUBLICATIONS

Rabinovitch, "Protect Your Users Against the Latest Web-Based Threat: Malicious Code on Caching Servers," IEEE Communications Magazine, IEEE USA, vol. 45, No. 3, Mar. 2007. pp. 20-22.

Klein, "Divide and Conquer—HTTP Response Splitting, Web Cache Poisoning Attacks, and Related Topics," Sanctum, Inc., Mar. 2004, 30 pages.

Saltzman et al., "Active Man in the Middle Attacks," IBM Rational Application Security Group, IBM Corporation, Feb. 2009, 18 pages.

Hori et al., "Secure Name Resolution System Using Plural DNS Cache Serviers," Technical Report of IEICE, The Institute of Electronics Information and Communication Engineers, vol. 104, No. 734, Mar. 11, 2005, pp. 75-80.

* cited by examiner

PROTECTION AGAINST CACHE POISONING

FIELD OF THE INVENTION

The invention relates to computer security in general, and more particularly to protecting computers against cache poisoning.

BACKGROUND OF THE INVENTION

Many computer systems employ a caching mechanism in order to improve their performance, where copies of frequently accessed data are stored in a temporary storage area that provides rapid access, thereby reducing the access time and/or cost that would otherwise be involved in frequently retrieving the data from its original location. For example, computers acting as Hypertext Transfer Protocol (HTTP) proxies cache web pages in order to reduce network traffic and improve latency, while computers acting as Domain Name System (DNS) resolvers that map names of networked devices to their numeric Internet Protocol (IP) addresses cache device name-address mappings for the same reason.

Computers that employ caches are, however, vulnerable to a type of attack known as cache poisoning in which an attempt is made to introduce a counterfeit entry into the cache. For example, in DNS cache poisoning a cached mapping between a network device and its IP address is altered to indicate an IP address that is supplied by the attacker, which location often includes malicious content, such as a computer worm or a computer virus. A client that subsequently requests the address for the network device is then given the wrong address, potentially exposing the client to the malicious content. Unfortunately, where a computer maintains a cache that is shared by multiple clients, a single instance of cache poisoning may ensnare many victims.

SUMMARY OF THE INVENTION

The invention in embodiments thereof discloses novel systems and methods for protecting computer systems against cache poisoning.

In one aspect of the invention a system is provided for protecting computers against cache poisoning, the system including a cache-entity table configured to maintain a plurality of associations between a plurality of data caches and a plurality of entities, where each of the caches is associated with a different one of the entities, and a cache manager configured to receive data that is associated with any of the entities and store the received data in any of the caches that the cache-entity table indicates is associated with the entity, and receive a data request that is associated with any of the entities and retrieve the requested data from any of the caches that the cache-entity table indicates is associated with the requesting entity, where any of the cache-entity table and cache manager are implemented in either of computer hardware and computer software embodied in a computer-readable medium.

In another aspect of the invention the system further includes a data request processor configured to provide to the cache manager with any of the data.

In another aspect of the invention the data request processor is configured to receive the data request from any of the entities and query the cache manager to determine if the requested data is available from any of the caches.

In another aspect of the invention the cache manager is configured to identify any entry that appears in at least a predefined number of the caches, move the entry from the caches to a global cache, and retrieve the requested data from the global cache.

In another aspect of the invention a method is provided for protecting computers against cache poisoning, the method including maintaining a plurality of associations between a plurality of data caches and a plurality of entities, where each of the caches is associated with a different one of the entities, receiving data that is associated with any of the entities, storing the received data in any of the caches that the cache-entity table indicates is associated with the entity, receiving a data request that is associated with any of the entities, and retrieving the requested data from any of the caches that the cache-entity table indicates is associated with the requesting entity.

In another aspect of the invention a method is provided for protecting computers against cache poisoning, the method including maintaining a plurality of associations between a plurality of data caches and a plurality of entities, where each of the caches is associated with a different one of the entities, receiving data that is associated with any of the entities, storing the received data in any of the caches that the cache-entity table indicates is associated with the entity, identifying any entry that appears in at least a predefined number of the caches, moving the entry from the caches to a global cache, receiving a data request that is associated with any of the entities, retrieving the requested data from the global cache if the requested data is in the global cache, and retrieving the requested data from any of the caches that the cache-entity table indicates is associated with the requesting entity if the requested data is not in the global cache.

In another aspect of the invention a computer program product is provided for protecting computers against cache poisoning, the computer program product including a computer readable medium, and computer program instructions operative to maintain a plurality of associations between a plurality of data caches and a plurality of entities, where each of the caches is associated with a different one of the entities, receive data that is associated with any of the entities, store the received data in any of the caches that the cache-entity table indicates is associated with the entity, identify any entry that appears in at least a predefined number of the caches, move the entry from the caches to a global cache, receive a data request that is associated with any of the entities, retrieve the requested data from the global cache if the requested data is in the global cache, and retrieve the requested data from any of the caches that the cache-entity table indicates is associated with the requesting entity if the requested data is not in the global cache, where the program instructions are stored on the computer readable medium.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
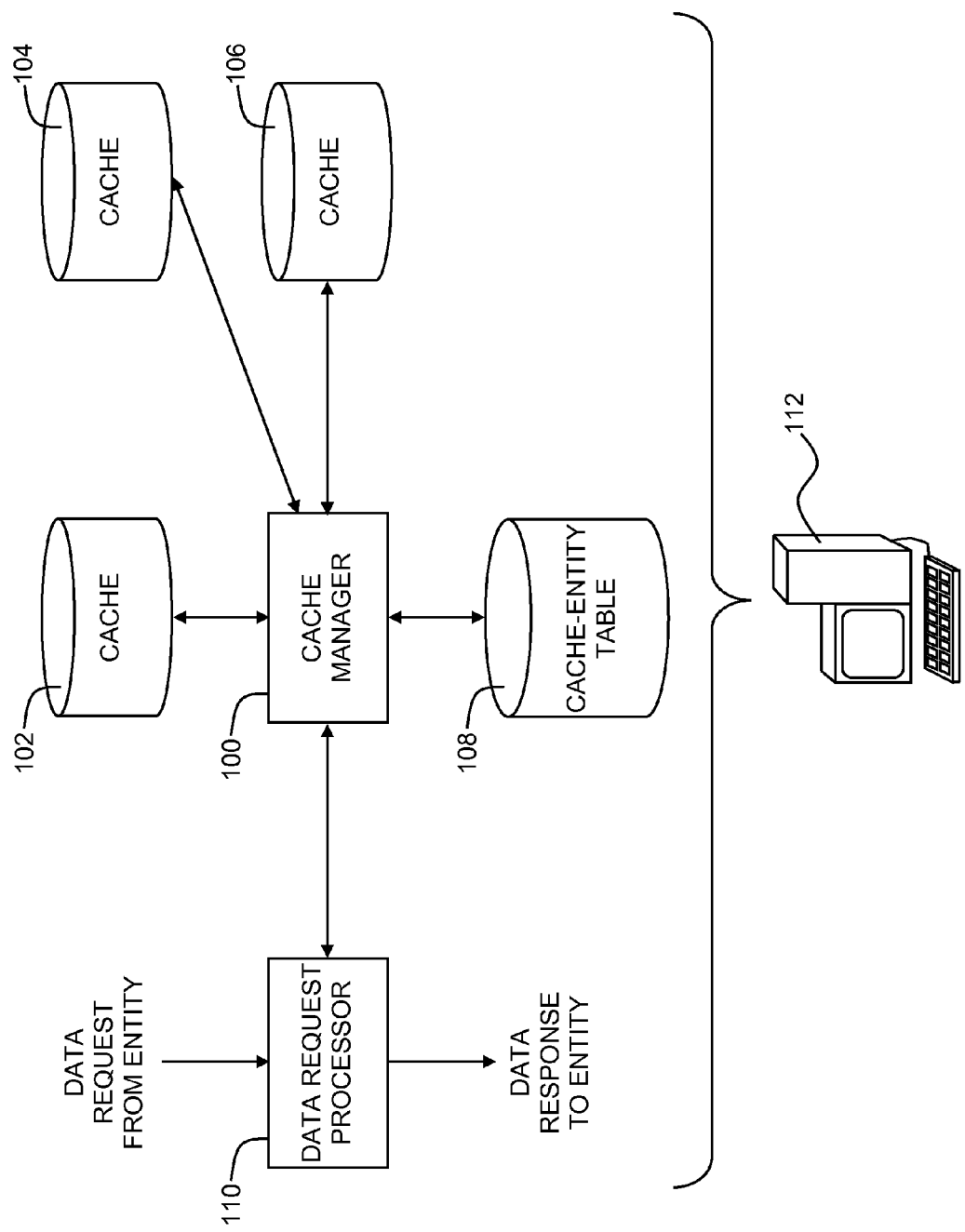
FIG. 1 is a simplified conceptual illustration of a system for protecting against cache poisoning, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for protecting computers against cache poisoning, constructed and operative in accordance with an embodiment of the invention. In the system of FIG. 1, a cache manager 100 manages multiple caches 102, 104, and 106. Although only three caches 102, 104, and 106 are shown for illustration purposes, cache manager 100 may manage any number of caches. Caches 102, 104, and 106 are all configured to include data of the same type, such as where each of caches 102, 104, and 106 is configured to store DNS address mappings, web pages, or any other known type of data that may be cached. Cache manager 100 manages each of caches 102, 104, and 106 in accordance with conventional cache management techniques except as is otherwise described herein. Cache manager 100 is also configured to maintain in a cache-entity table 108 on a data storage device associations between each of caches 102, 104, and 106 and an entity, where an entity may be a computer user, a client computer, a client software application, a network, or any other identifiable conduit, provider, or recipient of cache data or any grouping of such conduits, providers, or recipients. Preferably, no two caches are associated with the same entity.

A data request processor 110 receives a data request from an entity, and queries cache manager 100 to determine if the requested data is available from cache. Cache manager 100 identifies the requesting entity, determines if any of caches 102, 104, and 106 is associated with the entity, determines if the requested data may be retrieved from the cache that is associated with the entity, and retrieves the requested data from the cache, whereupon data request processor 110 provides the retrieved data to the entity. If the requested data are not available from cache, data request processor 110 processes the request in accordance with conventional techniques. For example, where the data request is for the Internet Protocol (IP) address associated with an Internet domain, and the address is not available from cache, data request processor 110 preferably performs a Domain Name Service (DNS) address lookup to determine the IP address of the domain. Data request processor 110 then provides the address to the entity, as well as to cache manager 110 for caching as described hereinbelow with reference to FIG. 2.

Any of caches 102, 104, and 106 and cache-entity table 108 are preferably stored on one or more data storage devices, such as, but not limited to, magnetic or optical data storage devices.

Any of the elements shown in FIG. 1 above, and in FIGS. 2, 3, 4A, 4B, 4C, and 5 below, are preferably executed by or otherwise made accessible to a computer 112, such as by implementing any of the elements in computer hardware and/or in computer software embodied in a computer-readable medium in accordance with conventional techniques.

Figure 2:
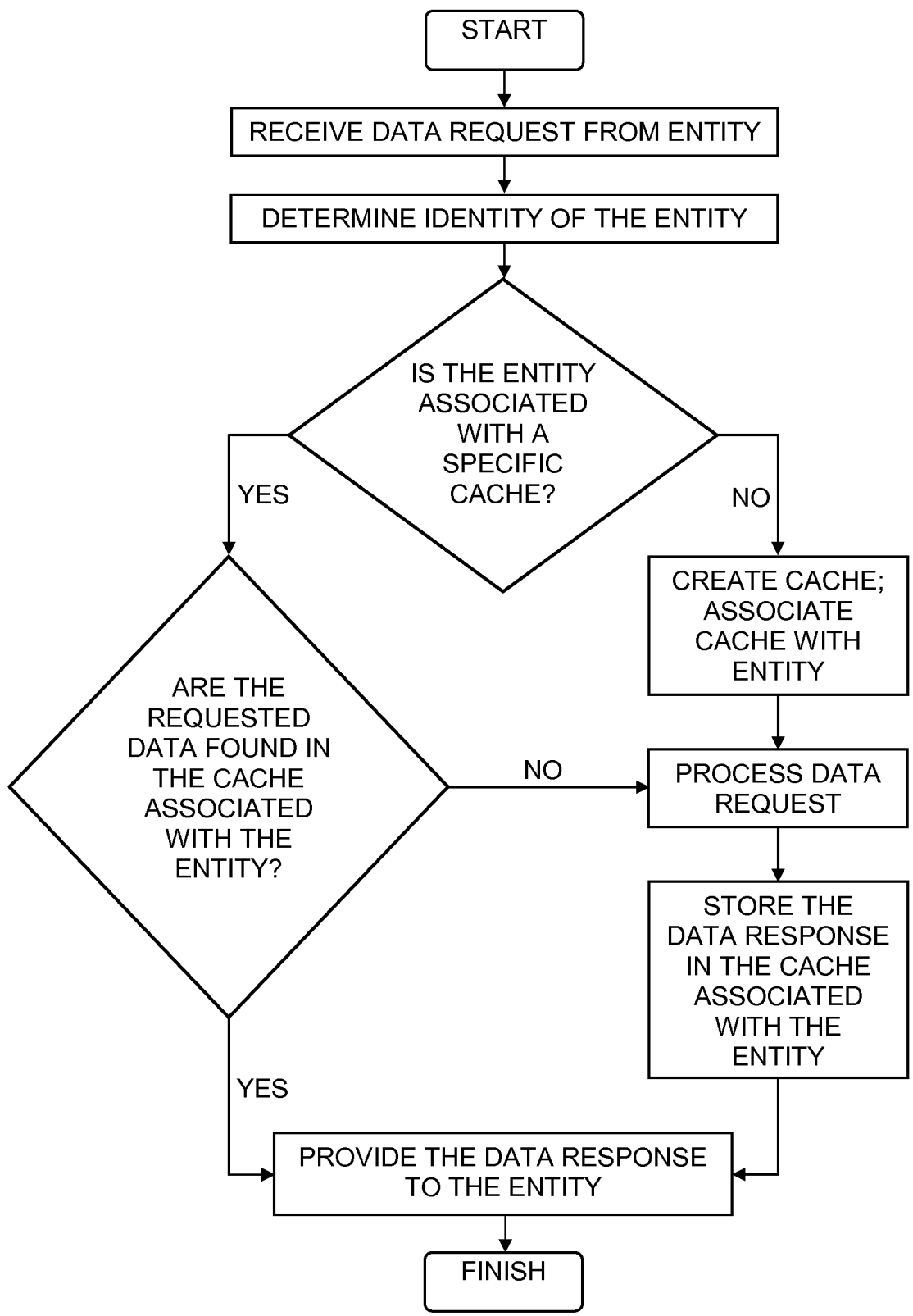
FIG. 2 is a simplified flowchart illustration of an exemplary method of operation of the system of FIG. 1, operative in accordance with embodiments of the invention.

Additional reference is now made to FIG. 2, which is a simplified flowchart illustration of an exemplary method of operation of the system of FIG. 1, operative in accordance with an embodiment of the invention. In the method of FIG. 2, data request processor 110 receives a data request from an entity, such as in the form of a DNS address lookup request from a web browser application running on a computer (not shown). Data request processor 110 then queries cache manager 100 to determine if the data is in cache. Cache manager 100 determines the identity of the entity, such as by determining the IP address of the entity as received with the data request. If the entity is associated with a specific cache, such as where cache manager 100 finds an association in cache-entity table 108 between the entity and a specific cache, then an attempt is made to find the requested data in the cache associated with the requesting entity. If the data is found in the cache, data request processor 110 provides the data to the requesting entity. If the entity is not associated with a specific cache, cache manager 100 preferably creates a cache for the entity and creates an association in cache-entity table 108 between the entity and the newly-created cache. Data request processor 110 then processes the data request in accordance with conventional techniques, provides the requested data to the requesting entity, and provides the requested data to cache manager 100, which stores the date in the cache associated with the entity.

It will be appreciated from the system of FIG. 1 and method of FIG. 2 that data that are associated with a request from an entity 'A' are stored in a cache that is specifically associated with entity 'A,' whereas data that are associated with a request from an entity 'B' are stored in a cache that is specifically associated with entity 'B,' where each cache is associated with a different entity. Furthermore, when requests for the data are received from entity 'A,', the data are retrieved from the cache that is associated with entity 'A,' and when requests for the data are received from entity 'B,', the data are retrieved from the cache that is associated with entity 'B.' In this manner, a cache poisoning attempt that is made in connection with a data request by entity 'A,' if successful, would only affect the cache that is associated with entity 'A,' whereas entity 'B' would not be affected.

Figure 3:
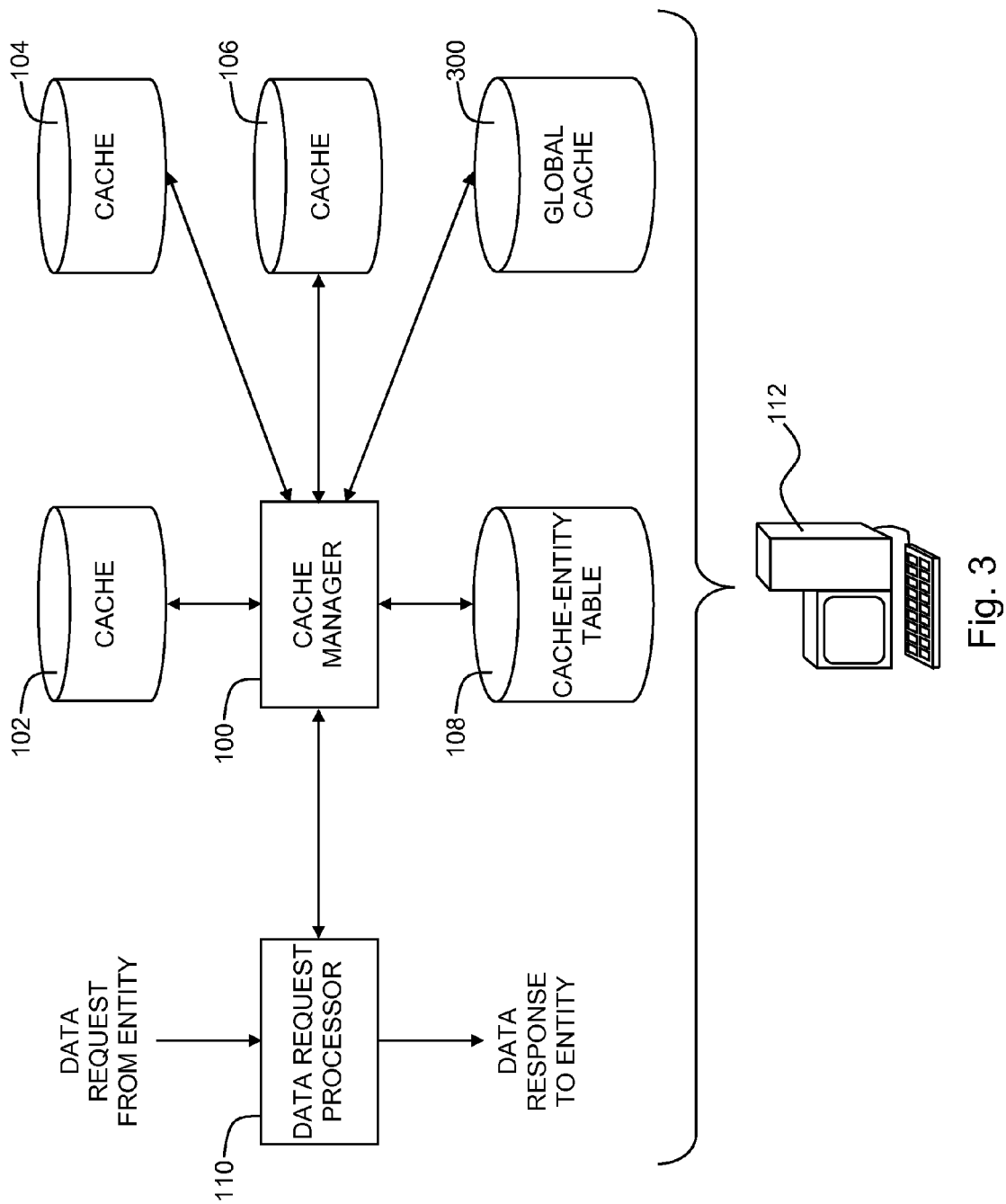
FIG. 3 is a simplified conceptual illustration of a system for protecting against cache poisoning, constructed and operative in accordance with an embodiment of the invention.

Reference is now made to FIG. 3, which is a simplified conceptual illustration of a system for protecting against cache poisoning, constructed and operative in accordance with an embodiment of the invention. The system of FIG. 3 is substantially similar to the system of FIG. 1, with the notable exception that in addition to cache manager 100 managing caches 102, 104, and 106 for corresponding entities, cache manager 100 also manages a global cache 300. Cache manager 100 moves from any of entity-associated caches 102, 104, and 106 to global cache 300 any cache entry that appears in at least a predefined number of entity-associated caches. Thus, for example, if each of caches 102, 104, and 106 is configured to store DNS address mappings, and a predefined number of these caches, such as at least two of them, include the same address mapping for www.eihjtypzw.com, cache manager 100 preferably moves the address mapping from the entity-associated caches in which the entry is found to global cache 300.

Figure 4A:
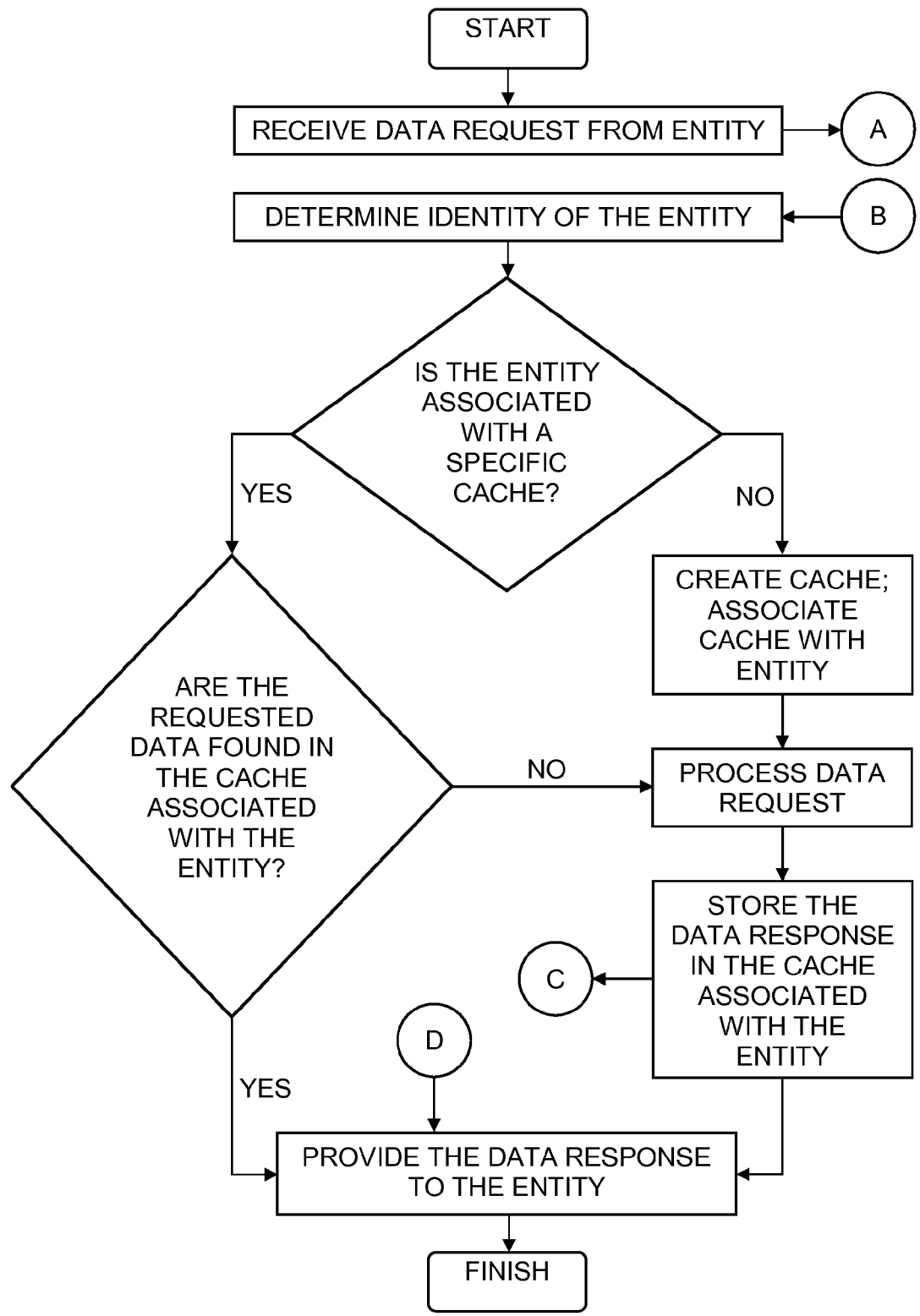
FIGS. 4A, 4B, and 4C, taken together, is a simplified flowchart illustration of an exemplary method of operation of the system of FIG. 3, operative in accordance with embodiments of the invention.
Figure 4B:
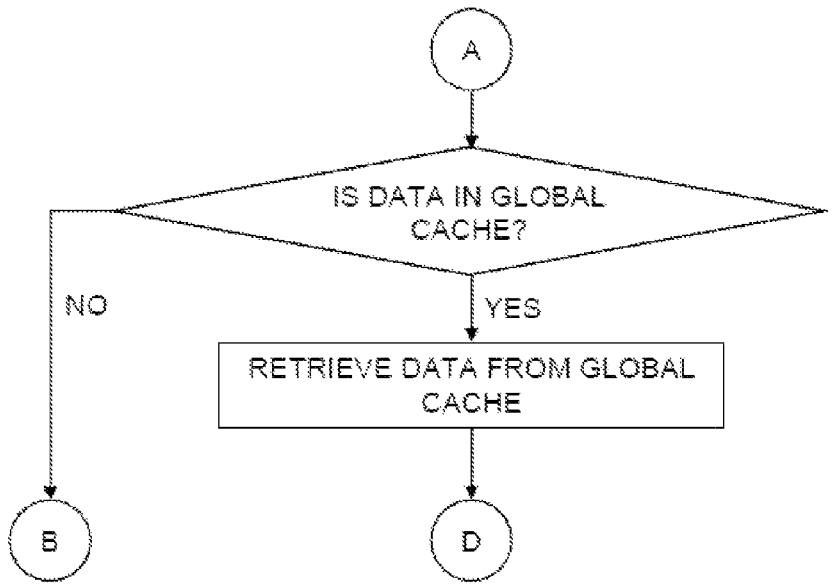
Figure 4C:
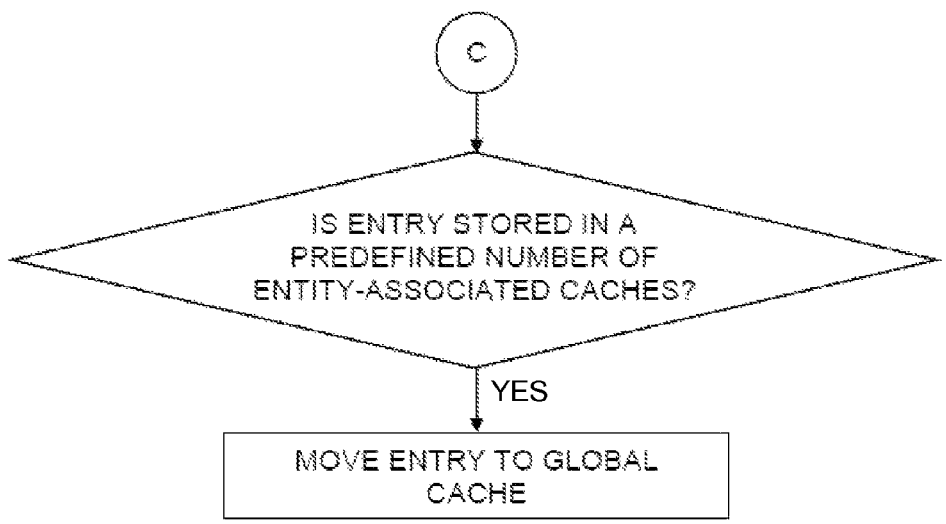

Additional reference is now made to FIGS. 4A, 4B, and 4C, which, taken together, is a simplified flowchart illustration of an exemplary method of operation of the system of FIG. 3, operative in accordance with an embodiment of the invention. The method of FIGS. 4A, 4B, and 4C is substantially similar to the method of FIG. 2, with the notable exception that when a request for data is received from an entity, cache manager 100 first attempts to find the requested data in global cache 300 before looking for the data in an entity-associated cache, and that an entry that is stored in at least a predefined number of entity-associated caches is preferably moved by cache manager 100 to global cache 300.

Figure 5:
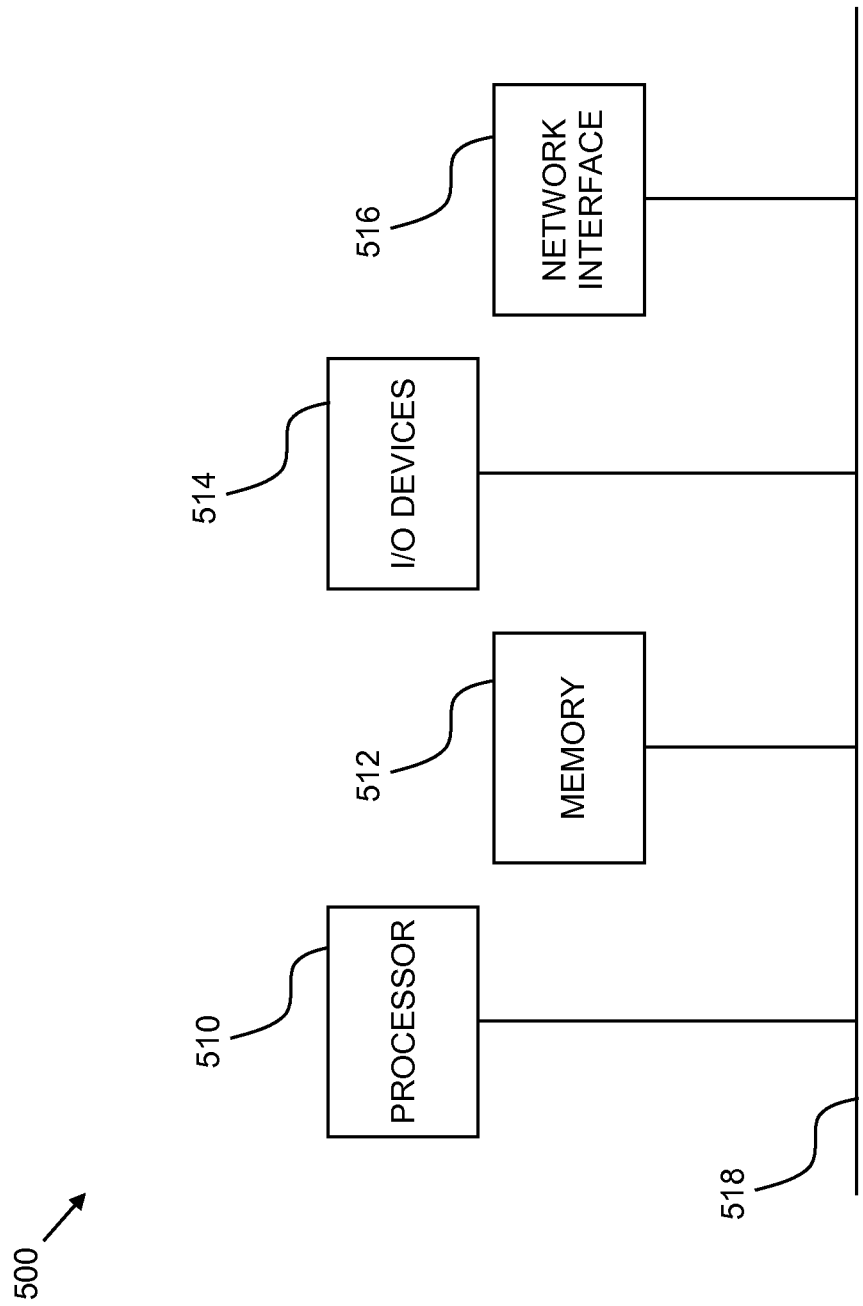
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1, 2, 3, 4A, 4B, and 4C) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for protecting computers against cache poisoning, the system comprising:
    one or more processors;
    a memory accessible by at least one of the processors;
    a cache-entity table configured to maintain a plurality of associations between a plurality of data caches and a plurality of entities, wherein each of said data caches is associated with a different one of said entities; and
    a cache manager configured to
        receive data that is associated with any of said entities and store said received data in any of said data caches that said cache-entity table indicates is associated with said entity;
        receive a data request from any of said entities and retrieve said requested data from any of said data caches that said cache-entity table indicates is associated with said requesting entity;
        identify any entry that appears in at least a predefined number of said data caches, and move said identified entry from said data caches to a global cache, said global cache separate from said data caches, wherein subsequent data requests for said identified entry are satisfied by retrieving said identified entry directly from said global cache; and
    wherein any of said cache-entity table and cache manager are implemented in either of computer hardware and computer software embodied in a computer-readable medium.

2. A system according to claim 1 and further comprising a data request processor configured to provide to said cache manager with any of said data.

3. A system according to claim 2 wherein said data request processor is configured to receive said data request from any of said entities and query said cache manager to determine if said requested data is available from any of said data caches and said global cache.

4. A system according to claim 1 wherein said predefined number of said data caches comprises at least two said data caches.

5. A method for protecting computers against cache poisoning, the method comprising:
    maintaining, in a cache-entity table, a plurality of associations between a plurality of data caches and a plurality of entities, wherein each of said data caches is associated with a different one of said entities;
    receiving data that is associated with any of said entities;
    storing said received data in any of said data caches that said cache-entity table indicates is associated with said entity;
    receiving a data request from any of said entities;
    retrieving said requested data from any of said data caches that said cache-entity table indicates is associated with said requesting entity; and
    identifying any entry that appears in at least a predefined number of said data caches, and moving said identified entry from said data caches to a global cache, said global cache separate from said data caches, wherein subsequent data requests for said identified entry are satisfied by retrieving said identified entry directly from said global cache.

6. A method according to claim 5 wherein said predefined number of said data caches comprises at least two said data caches.

7. A method for protecting computers against cache poisoning, the method comprising:
    maintaining, in a cache-entity table, a plurality of associations between a plurality of data caches and a plurality of entities, wherein each of said data caches is associated with a different one of said entities;
    receiving data that is associated with any of said entities;
    storing said received data in any of said data caches that said cache-entity table indicates is associated with said entity;
    identifying any entry that appears in at least a predefined number of said data caches;
    moving said entry from said data caches to a global cache, said global cache separate from said data caches;
    receiving a data request from any of said entities;
    satisfying said data request by retrieving said requested data directly from said global cache if said requested data is in said global cache; and
    in response to determining that said requested data is not in said global cache, retrieving said requested data from any of said data caches that said cache-entity table indicates is associated with said requesting entity.

8. A method according to claim 7 wherein said predefined number of said data caches comprises at least two said data caches.

9. A computer program product for protecting computers against cache poisoning, the computer program product comprising:
    a computer readable storage medium; and
    computer program instructions operative to
        maintain, in a cache-entity table, a plurality of associations between a plurality of data caches and a plurality of entities, wherein each of said data caches is associated with a different one of said entities;
        receive data that is associated with any of said entities;
        store said received data in any of said data caches that said cache-entity table indicates is associated with said entity;
        identify any entry that appears in at least a predefined number of said data caches;
        move said entry from said data caches to a global cache, said global cache separate from said data caches;
        receive a data request from any of said entities;
        satisfy said data request by retrieving said requested data directly from said global cache if said requested data is in said global cache; and retrieve said requested data from any of said data caches that said cache-entity table indicates is associated with said requesting entity if said requested data is not in said global cache, wherein said program instructions are stored on said computer readable storage medium.

10. A computer program product according to claim 9 wherein said predefined number of said data caches comprises at least two said data caches.

* * * * *